United States Patent [19]
Holcman

[11] Patent Number: 5,566,357
[45] Date of Patent: Oct. 15, 1996

[54] POWER REDUCTION IN A CELLULAR RADIOTELEPHONE

[75] Inventor: Alejandro R. Holcman, San Diego, Calif.

[73] Assignee: Qualcomm Incorporated, San Diego, Calif.

[21] Appl. No.: 319,199

[22] Filed: Oct. 6, 1994

[51] Int. Cl.$^6$ ............................. H04B 1/00; H04B 7/00
[52] U.S. Cl. ...................... 455/54.1; 455/33.2; 455/54.2; 455/38.3
[58] Field of Search .................... 455/54.1, 38.3, 455/56.1, 54.2, 13.4, 58.2, 33.2, 343; 379/59, 60, 58, 63

[56] References Cited

U.S. PATENT DOCUMENTS

| | | | |
|---|---|---|---|
| 5,167,024 | 11/1992 | Smith et al. | 395/375 |
| 5,216,674 | 6/1993 | Peter et al. | 371/29.5 |
| 5,363,430 | 11/1994 | Yamagata et al. | 455/54.1 |
| 5,369,785 | 11/1994 | Korhonen et al. | 455/54.1 |
| 5,375,254 | 12/1994 | Owen | 455/54.1 |
| 5,448,759 | 9/1995 | Krebs et al. | 455/54.1 |

FOREIGN PATENT DOCUMENTS

| | | | |
|---|---|---|---|
| 0315260 | 5/1989 | European Pat. Off. | H04Q 7/04 |
| 2701182 | 8/1994 | European Pat. Off. | H04M 19/00 |
| 0655872 | 5/1995 | European Pat. Off. | H04Q 7/32 |

*Primary Examiner*—Reinhard J. Eisenzopf
*Assistant Examiner*—Gertrude Arthur
*Attorney, Agent, or Firm*—Russell B. Miller; Roger W. Martin

[57] ABSTRACT

The filter of the present invention pre-processes signaling messages transmitted by the base station while the radiotelephone is in the idle mode. The radiotelephone informs the filter of the roam status and idle status and identity of the radiotelephone. The filter then intercepts the incoming signaling messages while the processor is in the sleep mode conserving power. When the filter detects a message requiring further processing by the processor, the filter interrupts the processor to process the message.

5 Claims, 4 Drawing Sheets

WORD 1

| INFORMATION ELEMENT | LENGTH (BITS) |
|---|---|
| $T_1T_2$ | 2 |
| DCC | 2 |
| $MIN1_{23-0}$ | 24 |
| P | 12 |

FIG. 2A

WORD 2

| INFORMATION ELEMENT | | LENGTH (BITS) | |
|---|---|---|---|
| $T_1T_2 = 10$ | | 2 | |
| SCC | | 2 | |
| SCC = 11 | | SCC ≠ 11 | |
| INFORMATION ELEMENT | LENGTH (BITS) | INFORMATION ELEMENT | LENGTH (BITS) |
| $MIN2_{33-24}$ | 10 | $MIN2_{33-24}$ | 10 |
| EF | 1 | VMAC | 3 |
| LOCAL/MSG_TYPE | 5 | CHAN | 11 |
| ORDQ | 3 | P | 12 |
| ORDER | 5 | | |
| P | 12 | | |

FIG. 2B

WORD 1

| INFORMATION ELEMENT | LENGTH (BITS) |
|---|---|
| $T_1T_2 = 11$ | 2 |
| DCC | 2 |
| SID1 | 14 |
| EP | 1 |
| AUTH | 1 |
| PCI | 1 |
| NAWC | 4 |
| OHD = 110 | 3 |
| P | 12 |

FIG. 3A

WORD 2

| INFORMATION ELEMENT | LENGTH (BITS) |
|---|---|
| $T_1T_2 = 11$ | 2 |
| DCC | 2 |
| S | 1 |
| E | 1 |
| REGH | 1 |
| REGR | 1 |
| DTX | 2 |
| N - 1 | 5 |
| RCF | 1 |
| CPA | 1 |
| CMAX - 1 | 7 |
| END | 1 |
| OHD = 111 | 3 |
| P | 12 |

FIG. 3B

| INFORMATION ELEMENT | LENGTH (BITS) |
|---|---|
| $T_1T_2 = 11$ | 2 |
| DCC | 2 |
| 010111 | 6 |
| CMAC | 3 |
| SDCC1 | 2 |
| 11 | 2 |
| SDCC2 | 2 |
| 1 | 1 |
| WFOM | 1 |
| 1111 | 4 |
| OHD = 001 | 3 |
| P | 12 |

FIG. 4

POWER REDUCTION IN A CELLULAR RADIOTELEPHONE

BACKGROUND OF THE INVENTION

1. Field of the Invention

The present invention relates to radio communications. More particularly, the present invention relates to analog cellular radiotelephones.

2. Description of the Related Art

An analog cellular radiotelephone system uses numerous antennas located throughout a geographical region. Each antenna is typically at the center of a cell that is divided into six 60° sectors. Each sector has a group of frequencies that are transmitted at low power in order to communicate with the mobile or portable radiotelephones that are within the sector. When the radiotelephone moves from one sector to another or from one cell to another, the frequency being used is automatically switched, allowing the telephone call to continue uninterrupted. This permits a radiotelephone user to remain in contact with the cell's base station and, therefore, the landline telephone system, any time the radiotelephone is within range of a cellular radiotelephone system.

While operating in a cellular radiotelephone system, data messages are continuously transmitted between the radiotelephone and the base station. These messages include orders requesting the radiotelephone transceiver to change transmit power level, to change channel assignment, to release the call, or other similar requests. Some of these messages are sent on the forward channel from the base station to the radiotelephone and other messages are sent on the reverse channel from the radiotelephone to the base station.

When the radiotelephone is powered up and has acquired the system and not handling a call it is considered to be in the idle state. While in this state, the radiotelephone is waiting for user action or base station orders. While idling, the radiotelephone continuously processes incoming signaling messages from the base station. There are three types of signaling messages: mobile station control messages, overhead messages, and control filler messages. These messages are discussed in greater detail in the Telecommunications Industry Association/Electronic Industries Association Interim Specification—95 (TIA/EIA IS-95).

The mobile station control message is broadcast over the forward channel to the radiotelephones. If the message contains the radiotelephone's mobile identification number (MIN), typically the telephone number, the radiotelephone knows that the message is meant for that particular unit. The radiotelephone then processes the message to determine what action to take. The format of a mobile station control message is illustrated in FIG. 2A and B. The different fields of this control message are discussed in greater detail in IS-95, section 3. This message can consist of both Word 1 and Word 2 and, in some instances, only Word 1.

In this figure, $T_1T_2$ of Word 2 is the type field, in this case '10'. SCC is the SAT color code. MIN2 is the area code portion of the radiotelephone's telephone number. EF is the extended protocol indicator. LOCAL/MSG_TYPE is the message type field, ORDQ is the order qualifier field, ORDER is the order field, and P is the parity field.

The overhead messages are transmitted to all radiotelephones in the system. These messages inform the radiotelephone about system parameters and changes in system parameters. The overhead messages are transmitted every 0.8 seconds by the base station. System parameters, however, rarely change. The format of an overhead message is illustrated in FIGS. 3A and B. The different fields of this message are discussed in greater detail in IS-95, section 3. This message consists of two words.

In this figure, DCC is the digital color code and SID1 is part of the system identification. EP is the extended protocol capability indicator, AUTH is the authentication procedure support field, PCI is the dual mode support field, NAWC is the number of additional words coming, and OHD is the overhead message type field.

Control filler messages are transmitted by the base station when no other messages are being sent over the forward control channel. These messages can be inserted between messages as well as between word blocks of a multi-word message. These messages are not used by the radiotelephone while in the idle state. It is not necessary, therefore, for the radiotelephone to process these messages while in the idle state. The format of a control filler message is illustrated in FIG. 4. The different fields of this message are discussed in greater detail in IS-95, section 3.

In this figure, CMAC is the control mobile attenuation field. SDCC1 and 2 are the supplementary digital color codes. WFOM is the wait for overhead message field.

An idling radiotelephone must process each of the above messages while idling in order to determine if the message is meant for that particular unit or if the message requires the radiotelephone to perform some task. This processing requires the radiotelephone's main processor to perform the processing. This wastes battery power which decreases the battery's stand-by time and talk time. There is a resulting need for a more energy efficient processing of signaling messages.

SUMMARY OF THE INVENTION

The present invention encompasses a method for handling messages in a radiotelephone. The radiotelephone has a processor and a filter. The messages are comprised of a first type of message and a second type of message and are transmitted by a base station. The method begins with the radiotelephone receiving a first signaling message from the base station. The filter determines the type of this first signaling message. If the first signaling message is of the first type, the filter ignores this message. If the first signaling message is of the second type, the filter routes the first signaling message to the processor.

BRIEF DESCRIPTION OF THE DRAWINGS

FIGS. 2A and B show the format of a typical mobile station control message.

FIGS. 3A and B show the format of a typical overhead message.

FIG. 4 shows the format of a typical control filler message.

DETAILED DESCRIPTION OF THE PREFERRED EMBODIMENT

Figure 1:
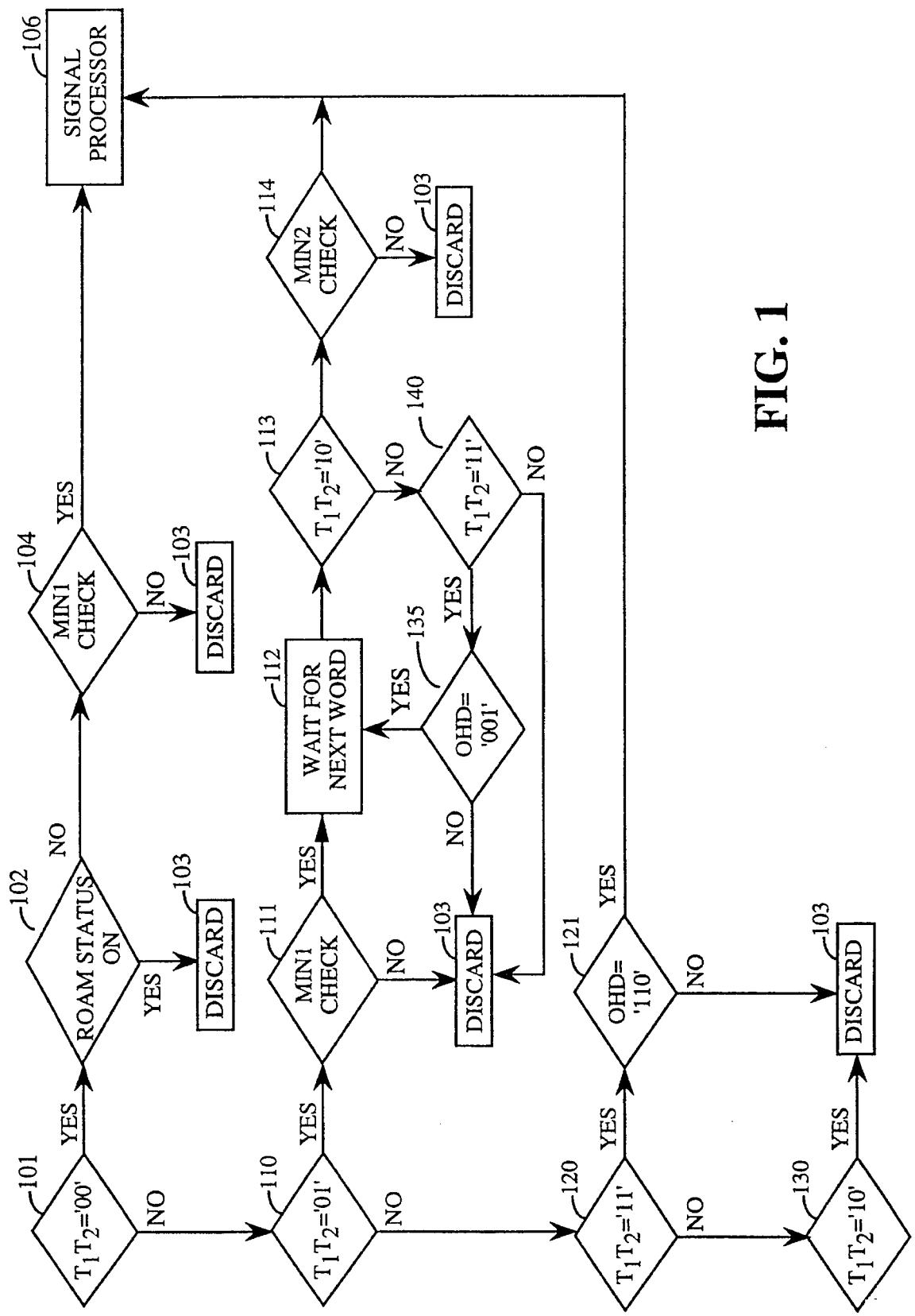
FIG. 1 shows a flowchart of the filtering method of the present invention.

The method of the present invention is illustrated in FIG. 1. This method provides filtering of the incoming messages while the radiotelephone is in the idle state. By filtering out the messages normally processed by the radiotelephone's main processor, the main processor can remain in its sleep state, thereby conserving power. The filter only alerts the processor to messages requiring it's attention.

The method begins with the main processor sending to the filter information regarding the radiotelephone's MIN, roam status, and idle-on/off indication. The roam status includes whether the radiotelephone is operating in its home system or operating in another system, also known as roaming.

In an alternate embodiment, the MIN can be either replaced or supplemented by another identifying number. This number can include the International Mobile Station Identifier (IMSI) that is currently being implemented in Europe and planned for future revisions of the analog cellular standard.

To save bandwidth in the home system, the carrier may only transmit MIN1, the radiotelephone's 7 digit telephone number, to the radiotelephone. Since the filter knows that the radiotelephone is operating in the home system and that the system is transmitting only MIN1, the filter only has to look for MIN1 and not MIN2, the radiotelephone's area code. If the radiotelephone is roaming, the carrier must transmit both MIN1 and MIN2 to properly identify the radiotelephone. Therefore, the filter must search for MIN2 in addition to MIN1.

The idle-on/off indication tells the filter when the radiotelephone is in an idle state. If the radiotelephone is not in the idle state, the main processor handles the processing of received messages. In this case, the filter is not needed. If the radiotelephone is in the idle state, the main processor is in a low-power sleep state and the filter performs the pre-processing of the received signaling messages.

Referring to FIG. 1, when a message is received, the filter first determines the message type. This is accomplished by checking the $T_1T_2$ bits of the word. If these bits are a binary '00' (101), the message is a mobile station control message with only Word 1 being sent.

If the roam status indicates that the radiotelephone is roaming (102), the signaling message does not need to be attended to by the processor. In this case the message is discarded (103). If the roam status indicates that the radiotelephone is not roaming (102), the filter next checks the MIN1 field (104). If MIN1 does not contain the radiotelephone's number, the message is not meant for this particular radiotelephone and is discarded (103). If MIN1 matches the radiotelephone's number, the message is intended for this particular radiotelephone and is forwarded to the processor (106) for further processing in accordance with the message type.

If $T_1T_2$ is a binary '01' (110), the base station transmitted a two word mobile station control message over the forward control channel. If this is the case, the filter next checks the MIN1 field (111) of Word 1 for the proper radiotelephone number. If the MIN1 field contents do not match the radiotelephone number, that message is not meant for this particular radiotelephone and is discarded (103).

If MIN1 is equal to the radiotelephone's number, the filter waits for the next word (112) in the sequence. If the next word does not have a binary '10' in the $T_1T_2$ field (113), the word is checked for possibly being a control filler message (135 and 140). A control filler message is skipped until a non-control filler message is received. If it is not a control filler message or a second word of a mobile station control message the word is discarded (103).

If the word is a mobile station control message, the MIN2 field is checked (114) to determine if the proper area code is present. If not, the message is not meant for this particular radiotelephone and the message is discarded (103). If the MIN2 field contents match up with the radiotelephone's area code, the message was meant for this particular radiotelephone and the message is forwarded to the processor for further processing (106).

If the initially received message contains a binary '11' in the $T_1T_2$ field (120), the word is an overhead message. The filter next checks the OHD field (121) of the received message to determine the type of overhead message. If the OHD field contains a binary '110', the message is a system parameter overhead message. In this case, the message is sent to the processor for further processing (106) since this word is required to update the system parameters. If the OHD field contains anything else, the message is not important and is discarded (103).

If the $T_1T_2$ field contains a binary '10' (130), the message is out of sequence (not the first word of a message) and is therefore not of importance to the processor. This message is discarded without further processing (130).

In the above described filter, when a message is transmitted to the processor for further processing, any well known interrupt scheme can be used to wake up the processor. This can include a hardwired interrupt line from the filter to the processor to bring the processor out of the sleep state and read the received message.

The operation of the filter of the present invention is enabled by the processor upon entering the idle state. When the filter is enabled, it performs the method of the present invention illustrated in FIG. 1. When the filter signals the processor that a message has been received requiring further processing, the filter is disabled to allow the processor to receive subsequent words. When the processor has received a full message, it then re-enables the filter to continue the process of the present invention.

The preferred embodiment of the process of the present invention does not provide for filtering the overhead messages transmitted from the base station. Filtering the overhead messages requires a more complex process. Also, the overhead messages are sent at a slower rate (0.8 s) than the regular word rate (46.3 ms) so that the power savings from filtering these messages is negligible. Alternate embodiments can filter the overhead messages also.

In an alternate embodiment, the filter can store the entire overhead message, and compare the incoming overhead messages to the stored message to determine if the message should be forwarded to the processor.

It can be seen that the above described filtering method greatly decreases the time that the processor has to be awake while the radiotelephone is in the idle state. By determining the types of messages received, the filter can discard unneeded messages and forward the important messages to the processor. Since the processor draws more power than the filter, the filter actually conserves power.

I claim:

1. A method for handling messages in a radiotelephone having a processor and a filter, the messages comprising a first type of message and a second type of message, each type of message including a message identifier field, the messages being transmitted by a base station, the method comprising the steps of:

receiving, in the radio, in the radio telephone, a signaling message from the base station;

determining, in the filter, the type of the received signaling message in response to the message identifier field of the received signaling message;

if the received signaling message is of the first type, ignoring the received signaling message; and if the received signaling message is of the second type, routing the received signaling message to the processor.

2. A method for filtering signaling messages in a radiotelephone having a processor, a filter, and an identity number, the signaling messages comprising a necessary type and an unnecessary type and transmitted by a base station, each type of message including a message identifier field, the radiotelephone having a plurality of modes including roam and idle, the method comprising the steps of: communicating the plurality of modes from the processor to the filter;

receiving, in the radiotelephone, a signaling message;

determining, in the filter, the type of the received signaling message in response to the message identifier field of the received signaling message:

if the received signaling message is of the unnecessary type, ignoring the received signaling message;

if the received signaling message is of the necessary type, interrupting the processor from the filter;

if the received signaling message is of the necessary type, routing the received signaling message from the filter to the processor; and if the received signaling message is of the necessary type, performing, in the processor, an operation in response to the received signaling message.

3. The method of claim 2 and further including the step of communicating the identity number from the processor to the filter.

4. A method for filtering signaling messages in a radiotelephone having a processor and a filter, the processor having a sleep mode and a wake mode, the signaling messages comprising a necessary type and an unnecessary type and transmitted by a base station, each type of message including a message identifier field, the radiotelephone having a plurality of operating modes including roam and idle, the method comprising the steps of:

communicating the plurality of operating modes from the processor to the filter;

entering, in the processor, the sleep mode;

receiving, in the radiotelephone, a signaling message;

determining, in the filter, the type of the received signaling message in response to the message identifier field of the received signaling message;

if the received signaling message is of the unnecessary type, ignoring the received signaling message;

if the received signaling message is of the necessary type, causing the processor to enter the wake mode by the filter;

if the received signaling message is of the necessary type, routing the received signaling message from the filter to the processor; and if the received signaling message is of the necessary type, performing, in the processor, an operation in response to the received signaling message.

5. A method for filtering signaling messages in a radiotelephone having a processor and a filter, the processor having a sleep mode and a wake mode, the signaling messages comprising a necessary type and an unnecessary type and transmitted by a base station, each type of message including a message identifier field, the radiotelephone having a plurality of operating modes including roam and idle, the method comprising the steps of:

communicating the plurality of operating modes from the processor to the filter;

entering, in the processor, the sleep mode;

receiving, in the radiotelephone, a signaling message;

determining, in the filter, the type of the received signaling message in response to the message identifier field of the received signaling message;

if the received signaling message is of the unnecessary type, ignoring the received signaling message;

if the received signaling message is of the necessary type, causing the processor to enter the wake mode by the filter;

if the received signaling message is of the necessary type, disabling the filter by the processor; and if the received signaling message is of the necessary type, performing, in the processor, an operation in response to the received signaling message.

* * * * *